Patented Aug. 8, 1939

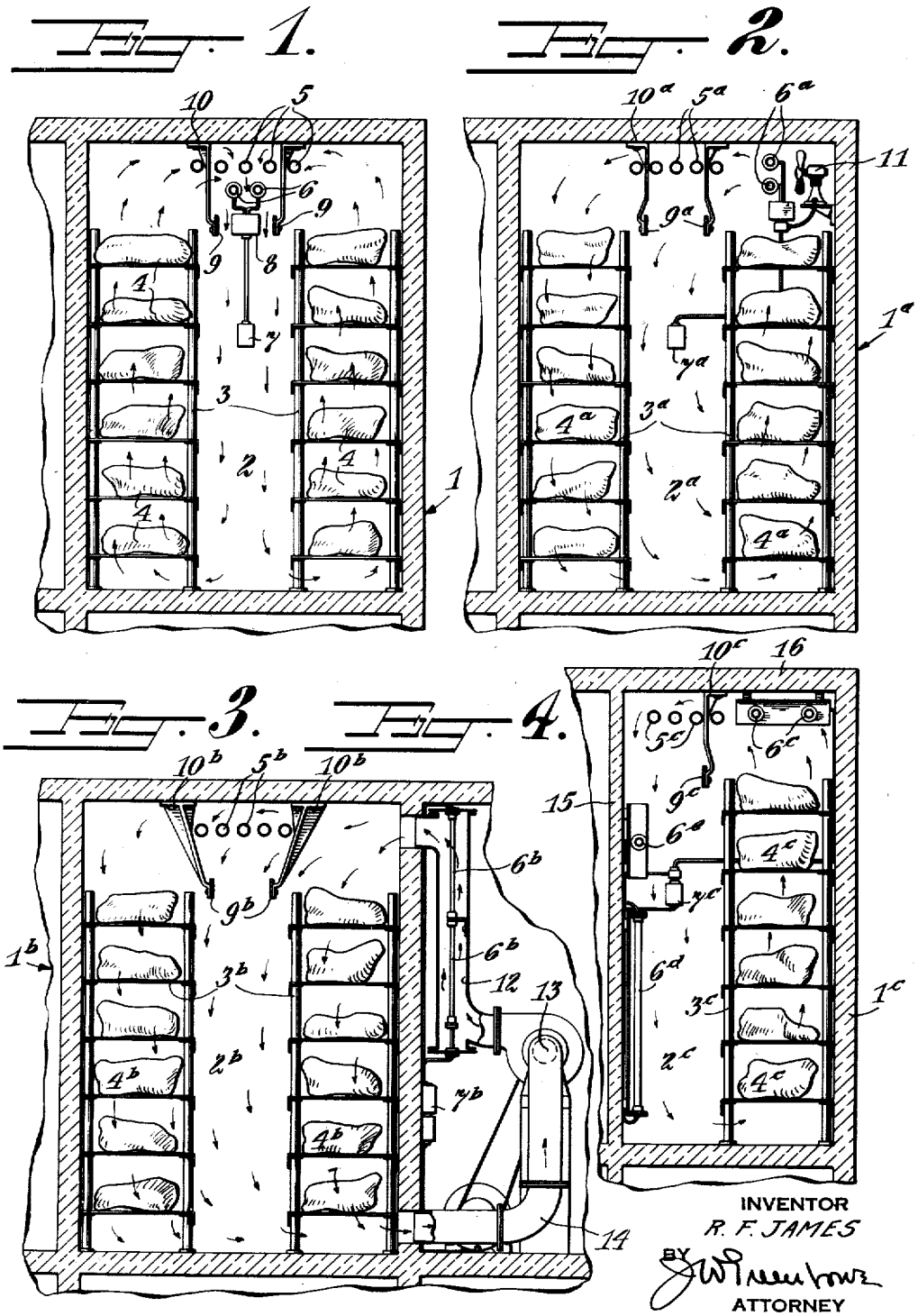

2,169,081

UNITED STATES PATENT OFFICE

2,169,081

PROCESS FOR THE TREATMENT OF MEAT AND THE PRODUCT THEREOF

Robert F. James, Mahwah, N. J., assignor to Westinghouse Electric & Manufacturing Company, East Pittsburgh, Pa., a corporation of Pennsylvania Application March 20, 1937, Serial No. 131,987

27 Claims. (Cl. 99—107)

This application is a continuation-in-part of my copending application Serial No. 687,020, filed August 26, 1933, for Radiating process, and owned by the same assignee.

This invention relates to the treatment of meat and more particularly to an improved process for the ripening and storing thereof, as well as the product of said process.

The principal object of my invention, generally considered, is to control the process of ripening meat without spoilage, including the avoidance of the growth of mold and bacteria on such material during the process of ripening and storing.

Another object of my invention is the treatment of meat at an elevated temperature, in order to increase the speed of ripening, while avoiding the tendency of fat in said meat to become rancid and substantially preventing the growth of mold and bacteria.

A further object of my invention is to increase the speed of ripening meat by raising the temperature at which it is treated, while at the same time avoiding drying of said meat by increasing the humidity of the atmosphere by which said meat is surrounded.

A still further object of my invention is to increase the turnover of meat held for ripening while reducing the necessary storage time and space by increasing the speed of the ripening process.

An additional object of my invention is to raise the temperature at which meat is held during ripening in order to save expense by decreasing the cost of, and power required for, refrigeration during ripening, provided refrigeration is used.

Another object of my invention is to ripen meat while subjecting it to bactericidal and fungicidal radiations, the time of application of said radiations being so short, or the intensity so low and/or the spectral energy distribution being such that rancidity is prevented while the growth of bacteria and molds is inhibited.

A further object of my invention is the avoidance of ripening meat so slowly that mustiness develops, due to the growth of molds, and penetrates meat to an undesirably great extent, thereby developing an improved product from the standpoint of taste, and eliminating wastage due to trimming off spoiled portions of said meat.

A still further object of my invention is a tenderized meat free from objectionable taste and odor, retaining all desirable flavor, and of greater food value, vitamin content, and digestability than ordinary meat.

Other objects and advantages of the invention will become apparent as the description proceeds.

When meats are kept indefinitely in the customary manner, they are subject to tissue changes:

One of these may be called broadly antolysis. After such antolysis has set in, the meat becomes tender, the degree depending on the extent to which the process has advanced. Such change is attributable to enzymes which bring about a chemical change within the body of the meat. Temperature has a great effect on the rate of antolysis; for example, at 0° F., the enzymes that tenderize meat are so very much retarded that such material may be kept six months or more. It has heretofore been impossible to preserve large pieces of meat by surface treatment, while exposed to the atmosphere, without breaking them up into many very fine particles, so that such treatment reaches every portion of the meat.

Another kind of tissue change, which makes it expensive to tenderize meats in their original state while merely subjected to refrigeration, is external and due to aerobic growths such as molds, yeasts, and bacteria. Traces of such aerobic growths are invariably present in all of the containers for meat between the stockyard and the cook stove. Such growths breed on the walls of ice-boxes, refrigerator cars, and even in household refrigerators. They seem to be present in the air within such containers and have heretofore made it impossible to keep uncovered meat in its original form indefinitely. The rate of fungoid and bacterial or yeast growth may be retarded by reducing the temperature, but this simultaneously retards the enzyme reaction which makes meats tender.

It is well known that tender meats command a higher price in the markets and, consequently, it is desirable to have all meats tender at the time they are sold. Although a certain proportion of meats consumed comes from a sufficiently high grade of cattle, or other live stock, so that they are more tender than the rest immediately upon killing, a vast majority of live stock, and the major portion of each animal, is initially tough. In accordance with conventional practice, a side of beef, a whole wild fowl, or other unit of live stock or game, is "hung" in a butcher's ice-box for a period sufficient to produce tender meat by the desired enzymatic action. This process, when carried on at temperatures sufficiently high for the purpose, also results in aerobic growths which render the surface of meat, on which they develop, inedible. Meat prepared in this manner is said to be "hung" or "ripened" and is tender, such treatment results in high losses due to fungoid or bacterial growths and dehydration. Thus the cost of such tender meat, as is produced by hanging, is increased, not only by the cost of maintaining the low temperature, but also by the cost of that portion of the meat which must be discarded because of spoilage from aerobic growths.

It is thus commercially impossible in treating meat in its original form or state by the above-mentioned conventional "hanging" method, that is, raw meat in which the particles are bound together as in the living animal, to prevent aerobic growths at temperatures which will economically permit the functioning of the enzyme reaction which produces tender meat.

Of course meat has been preserved by powdering or comminution accompanied by the killing off of deteriorating influences, and meat has been dried in slices, but such processes are not tenderizing and applicable to meats in their original form as they are commercially handled today by butchers and in the home.

In an animal carcass are found definite and typical aggregations of cells which make up the various tissues commonly described as muscle, fat, bone, etc. For the sake of this discussion, we are primarily interested in the connective, muscle, and fat tissues, since they constitute the bulk of the animals which are used for food.

The edible tissue, to which the term toughness or tenderness is usually applied, may be roughly subdivided into two general classes: the muscle cells and the connective tissue or cells which act as a binder for the muscle cells. There is a marked difference between the functions and the chemical composition of the connective cells and the muscle cells.

The connective tissue contains approximately 60% water and 40% solids, with the principal organic constituent of the solids being a compound called "collagen". This albuminoid collagen composes about 35% of this type of tissue, imparts the fibrous characteristics thereto, and being elongated wick-like material, may be acted on quickly due to capillary action by the appropriate enzyme under favorable conditions of moisture and temperature.

The muscle cells, on the other hand, contain approximately 75% water and 25% solids, and may be considered as ellipsoidal with protective surface membranes. The solids are composed roughly of 20% protein which exhibit many of the properties of globulin. Action on such cells is by osmosis and may be delayed if the surface membranes are kept intact by preventing loss of moisture therefrom.

It may be logically deduced that the tenderness of muscle tissue, which constitutes the largest proportion of our meat foods, is dependent upon the condition of the connective tissue. Where this connective tissue retains its coherence and elasticity, the physical effort of separation is relatively great and the meat is considered as tough. When the elasticity and coherence of this tissue has been broken down, the meat is considered tender. Hence the primary requirement in the tenderizing of meat is to remove the elasticity or coherence between the cells constituting the connective tissue.

Let us now consider the methods by which meat may be made tender.

To a certain extent the connective tissue may be broken down by the application of heat. However, this is obviously not practical in all cases, nor is it entirely satisfactory, since the effect of heat is one of coagulation rather than digestion.

A second method for decomposition is the use of chemical solvents but, again, this is not entirely practical since it is destructive and may possibly render the tissue unpalatable.

A third method is that which has been in common use for the tenderizing of meat. It consists in "hanging" the meat in the manner previously mentioned until the desired amount of chemical change has taken place in the tissues. One of these chemical changes is the hydrolysis of the connective tissue so that elasticity is removed.

This natural reaction is due to enzymes which are present in all organized animate substances, whether they be of plant or animal origin. These enzymes serve as catalysts in that they may initiate a chemical reaction, without actually participating in the reaction themselves.

Historically, enzymes have been known to exist for some time, but their chemical structure, in many instances, is not known, since methods of analysis destroy their existence.

From their behavior characteristics the following general conditions have been observed:

(1) They have definite specificity of action, in that there is a definite enzyme for each definite organic compound, and they will react only with this compound.

(2) The activity of enzymes increases with increases in temperature within certain fixed limits, and it is safe to say that the majority of enzymes cease to exist, due to their destruction, at temperatures of 100° C., or greater. The action of enzymes accelerated by heat follows the law of Van't Hoff within certain limits. It is interesting to note that each enzyme has a very definite and specific optimum temperature of reaction.

(3) Concentration of the substrate. The action of enzymes naturally will depend upon the concentration of the material upon which they are acting.

(4) Concentration of the enzymes. The velocity of a reaction initiated by an enzyme is dependent upon the concentration of the activating enzyme. This effect has been expressed by the Schutz-Borissov rule:

$$X = K\sqrt{aET}$$

X = mass of substrate transformed
T = the time of reaction
a = initial concentration of the substrate
E = concentration of the enzyme (5) The activity of enzymes is markedly affected by acids and alkalies and again shows a maximum rate of reaction at an optimum pH. The optimum pH is specific for each individual enzyme.

(6) The action of enzymes is either increased or diminished by the presence of various concentrations of ionizable salts. This effect is attributed to the colloidal characteristics of enzymes.

(7) The activity of enzymes may be depressed and even extinguished by the presence of inhibiting agents or poisons. Thus it may be that an enzyme-initiated reaction may never run to completion due to the toxicity of the end products generated by the reaction. This same reaction of inhibition or inactivation may be due to an equilibrium between the enzyme, the substrate, and the products of reaction.

(8) Radiant energy of different wave lengths has been found to stimulate or suppress enzymic action. It has been found that the action of radiant energy upon enzymes is a function of the wave length and the quantity of incident radiation absorbed. Small quantities of radiant energy may accelerate the action, while larger quantities may not only inhibit the activity, but cause actual destruction of the enzyme itself.

(9) Moisture. Since enzymes do not function in the dry state, they are dependent upon the presence of moisture for their activity.

In the light of the known characteristics of enzymes, it may be seen that the old method of tenderizing meat by hanging at low temperatures served as a partial inhibitor for enzymic action and did not permit a selective action to take place. Under these conditions of known selectivity, the enzymes acting upon the connective tissue partially hydrolyzed this tissue and thus made the meat tender.

Simultaneous with this action there was a general dehydration of the tissue under treatment which further acted as an inhibitor. This dehydration was a function of the low temperature, to which the tissue was subjected in order to inhibit mold and bacterial growth.

With the autolysis of the tissue by the above-mentioned old method, the cells of the muscle tissue underwent a change in osmotic tension, and a break-down within the cells took place due to the enzymes within them. The proteins making up the muscle cells were decomposed with a subsequent change in flavor and odor. This change in the muscle cells took place during the enzymic action on the connective tissue and, since such cells are more delicate than the connective tissue, a deleterious digestion took place prior to the desired effect of said connective tissue. The result, therefore, was a meat that was tender but characterized by a taste, texture, and general composition entirely different from that of fresh meat and to generally undesirable degree. It was this undesirable degree which has earned the description of "hung" meat.

Because of the specificity of enzymes, as far as temperature, moisture, pH, etc., are concerned, I propose to take advantage of reactions which may be produced to selectively accelerate some without undesirably accelerating others, thus obtaining a meat which is tender, due to a digestion of the connective tissue, while still maintaining the initially fresh, moist, and savory characteristics.

Without entering into a detailed description of the minutiae of action, these desirable effects are obtained as follows:

(1) The meat is stored at a temperature which is preferably optimum for the enzymes acting upon the connective tissue, without being optimum for the enzymes affecting the constituents of the muscle cells, or those acting upon the fat tissues.

(2) Dehydration of the meat is prevented by maintaining a sufficiently high moisture content of the air or gas surrounding the meat.

(3) A source of ultra-violet light of selected characteristics and intensity is placed in such a position that direct radiation therefrom falls on the meat, and/or the air or gas surrounding the meat which is circulated past the source and thence to the meat.

The radiation from the ultra-violet source is of such an intensity and wave length that it inhibits the growth of mold and/or bacteria, thus preventing spoilage. It also directly, or indirectly through the circulating gas, is believed to accelerate enzymes on the surface of the meat. The presence of adequate moisture and the normal hydrogen ion concentration prevents alteration of the osmotic tension of the walls of the muscle cells, so that they virtually maintain their status quo of life for a period of time during which the connective tissue is being digested.

I have found from experimental evidence that it is possible to cause a digestion of the connective tissue and a subsequent tenderness, without disintegration of the muscle cells and consequent change in flavor or odor and that the cut surfaces of the meat will retain their brightness and desirable color.

In developing the foregoing ideas in practical experimenting to avoid the undesirable results heretofore accompanying the tenderizing of meats, I have inserted an aerobic growth inhibitor in the ice-box, refrigerator, or other container, where meats are kept, and found it possible to shorten the hanging time considerably, by raising the temperature at which the food is kept, and maintaining high humidity, thus speeding up the rate of tenderizing reaction. Ordinarily, a substantial increase in temperature is not possible because the aerobic growths are too rapid, but I have found that the inhibitor permits dispensing with a large portion of, or the entire, refrigeration expense, at the same time preventing spoilage due to surface deterioration from aerobic growths, either present on the meat as received in the ice-box, or deposited on the meat from the air therein. It is therefore possible to speed up one element of tissue change to produce tenderness and at the same time inhibit, or prevent, the speeding up of the other which produces surface spoilage.

A preferred surface growth inhibitor is a radiant-energy lamp operated at a low temperature and giving off ultra-violet radiations which will kill bacterial, fungous, and other aerobic organisms, before they can have a deteriorating effect on the outer portions of the meat. As described and claimed in my copending application Serial No. 734,620, filed July 11, 1934, such a lamp generates a strong spectrum in the region between 2500 and 3000 A. U., with substantially no radiation below about 2500 A. U. and in the infra-red region. The intensity of the radiations from this lamp may be regulated by the current therethrough, so that those generated are sufficient to inhibit the growth of fungi or bacteria, without causing rancidity of the fat or other undesirable effects within the period of time required for radiation during the ripening process.

It has been found that various wave lengths of radiant energy are capable of acting upon fat substances to form products which impart to the fats the property described as rancidity. It has been found that this reaction takes place when fats are irradiated with wave lengths lying in the ozone-generating region of the ultra-violet, high intensities in the visible spectrum, and energies in the near infra-red spectrum.

Since the radiations from the mold and bacterial inhibitor specified in this disclosure do not generate much energy in either the visible or infra-red region, and are inhibited from radiating substantial quantities of energy in the ozone generating region of the ultra-violet spectrum by the construction of the generator, it is possible to irradiate meat during the period necessary for the tenderizing reactions to take place without causing sufficient action upon the fat to make it rancid.

The greater the distance between the lamp and the meat, the greater the intensity at which the lamp should operate. Varying quantities and types of material require varying intensities and varying lengths of treatment. The quantity and nature of the animal matter being variable, it is frequently desirable to take cultures of the meat surfaces to determine definitely the proper intensity and duration of treatment periods.

Various experiments have been made to determine the optimum conditions for ripening meat in accordance with my process. In the beef storage room of one plant a space of about 500 cubic feet was partitioned off and seven of my radiant-energy lamps installed. Instead of being cooled to a normal refrigerating temperature, the space was maintained at a temperature about, or somewhat above, 45°, say about 55° F. to speed up the enzymatic action which tenderizes meat. Even at this relatively high temperature, neither molds nor bacterial grew on the meat and the cuts were aged in five days to a tenderness which formerly required five weeks.

Following completion of the foregoing experiments, an application on a much larger scale was made. Eight lamps were installed in a room measuring 18 x 8½ x 12 feet, four lamps being placed at each end of the room. This room was maintained at a temperature of 55 to 58° F. and a relative humidity of 90 to 100%, and as much as 1400 pounds were aged or ripened at one time. Compared with the three to five weeks formerly required for aging the meat, only three or four days were needed under the lamps, as described in the application before mentioned, at high temperature and humidity. The shrinkage or weight lost amounted to only a little more than one-fourth of one percent. As for trimming waste, there was none other than that incurred in removing the surface portion which had been darkened by the direct radiation. There was no growth of mold or bacteria.

The net results of tests on meat ripening, in accordance with my invention, showed very definitely that the growth of bacteria and mold can be controlled to a practical elimination. The time of curing or ripening can be reduced by operating the cooling rooms at higher temperatures, thus increasing the rate at which the meat is aged, and at the same time preventing surface spoilage.

One disadvantage which had appeared during the "hanging" operation at elevated temperature was the excessive drying out of the meat. This, however, was obviated by increasing the moisture content in the air, whereby the reduction in weight for the meat samples was practically avoided. Increasing the moisture would have a tendency to increase the growth of mold and bacteria, but the results which have been obtained show very definitely that bacterial and mold growth can be satisfactorily controlled. In one experiment with meat ripening, two hips, two ribs, and two short loins of beef were placed in the radiation room. The temperature at the start was 42° F. with the relative humidity 100%. The heater and humidifier were started and the temperature came up gradually to a final value of 55° F. with the humidity maintained at 94% or higher. The meat was removed to a cooler about 3½ days later. The appearance of the meat, which had been ripened, was very good and there was very little surface drying or darkening, with no evidence of mold or spoilage.

A summary of the valuable results obtained by practicing my process of meat tenderizing, is as follows:

Mold and bacterial growth can be controlled by radiation from lamps constructed in accordance with my application Serial No. 734,620, previously referred to, at temperatures up to 56° F. or more, and a relative humidity of 90 to 100%, thus reducing the shrinkage or trimming losses.

With adequate air circulation it is not necessary to have the direct radiations from such lamps reach the surfaces to be protected. This simplifies the installation of lamps in storage rooms for meat and other perishable material.

The tenderizing process for meat is speeded up due to the radiations from the lamps and the high temperature and high humidity conditions made possible by the use of my lamps. An aging period of three or four days is sufficient for tenderizing, as contrasted with three to five weeks in accordance with the previous processes.

Direct radiation of the cut surfaces of meat results in some darkening. This effect can be minimized by reducing the intensity of direct radiations and securing the sterilization by air circulation. The incidence of energy upon the cut surface of the meat causes, a chemical change within the organic compounds of the meat with the incident formation of a protective coagulum having a pigmentation.

Sagging of meat tissues, such as short loins, for example, due to the high temperature at which they are aged, may be prevented by placing them on the rounded side, or by supporting the flank so that it cannot droop.

Meat tenderized for three or four days under my lamps may be kept at a lower than normal refrigerating temperature, say about 34° F., for a period of several weeks if necessary before marketing. The meat can be kept in best condition by the use of my ultra-violet lamps and air circulation. This reduced temperature facilitates the butchering or sectioning of the carcass.

There is a worthwhile saving in refrigeration costs due to increasing the temperature of the aging room from 35° F. to 55° F. or higher, and in space due to more than doubling the possible rate of stock turnover.

Air currents may be provided by one or two fans or by a humidifier which moistens and circulates the air.

On account of the speed at which meat can be tenderized in accordance with my process, it is possible to tenderize beef successfully even if of a quality normally so poor that it could not be made tender by any former commercially used practice.

An ultra-violet lamp, in accordance with my copending application Serial No. 734,620, previously referred to, even when operating in a refrigerator, seems to slightly raise the temperature of the surface of the meat on which the radiation falls and somewhat dry the surface, unless the humidity is maintained very high or the surface is protected by a film or coating of an air excluding fluid. One such fluid which I have tried with success is a colorless, odorless, good grade of mineral oil, pervious to ultra-violet light. Meat coated with such an oil has been found not to be subject to dehydration while tenderizing in accordance with my invention, even if the desired high humidity is not maintained.

Due to the fact that some fungi and aerobic bacteria have a less rapid rate of growth than others, it is not always necessary in every refrigerator to treat the surface of the meat continuously with ultra-violet light from one of my lamps. In such cases it is only necessary to subject such fungoid growths, as develop on the meat surface, to the action of the ultra-violet light for a proportion of the time found necessary to avoid surface spoilage. I have therefore kept beef surfaces free from fungoid growths, even though the ultra-violet light generator was in operation for only one-third of the time. Under these conditions, all that is necessary is to cause relative movement between the light and the food surface at such a rate that each portion of the meat surface is treated with an adequate amount of ultra-violet radiation.

Even this relative movement may be dispensed with by providing an adequate circulation of air to deliver the activated particles, produced by the radiation, to all surfaces of the meat under treatment. The details of time and intensity will, of course, vary with the nature and quantity of fungi spores present. Cultures may be used to determine the treatment time for a particular ice-box or this time may be determined by experiment. However, the results of the experiments, as heretofore enumerated, will enable those skilled in the art to practice the invention without further developments although, of course, routine tests are desirable.

Referring now to the drawing illustrating apparatus embodying my invention.

Fig. 1 is a transverse sectional view of a refrigerator or meat-treating compartment embodying and including means for practicing my invention.

Fig. 2 is a view similar to Fig. 1, but showing a modification.

Fig. 3 is another view similar to Fig. 1, showing another embodiment and

Fig. 4 is a further view similar to Fig. 1, and showing a further embodiment.

Referring to the drawing in detail, and first considering the embodiment of my invention illustrated in Fig. 1, there is shown a refrigerator or meat-treating device 1 comprising a room or compartment 2 provided with shelves, racks, or other means 3, for supporting and storing meat 4 and the like, and any suitable means (not shown) for maintaining a high relative humidity or one at or near 100%. The device is maintained at the desired temperature by means of coils 5 of brine or other cooling or heating material.

Disposed preferably near and below the coils is means for generating ultra-violet light having a major part of its radiations near 2500 A. U., which means desirably takes the form of one or more lamps 6 constructed in accordance with my copending application, Serial No. 734,620, previously referred to, and desirably operated by a switch 7, through a transformer 8. Hooks (not shown) may be provided for suspending large pieces or carcasses of meat. Tracks or rails 9 are desirably provided for the movement of the meat, said tracks being supported in position in any desired manner, as by means of brackets 10.

In operation, the coils, if refrigerating, cause the air in the refrigerator to circulate, as indicated by the arrows; that is, downwardly in the center, and upwardly at the sides and through the meat which is desirably stacked on the shelves 3, or "hung", so as to permit the air to circulate therearound. The ultra-violet light from the lamp or lamps 6, with or without reflectors (not shown), not only preserves the exterior surface of the meat from deterioration due to aerobic bacteria and molds, but also activates the air without, however, forming any appreciable amount of ozone or oxides of nitrogen, and said activated air by being circulated and reaching all parts of the surface of the stored meat 4, preserves the surface of said meat from deterioration during the process of tenderizing the meat.

Fig. 2 discloses apparatus comprising a device 1ª involving a room or compartment 2ª provided with shelves or racks 3ª for supporting meat 4ª and the like, as well as humidifying means (not shown). As in the preceding embodiment, coils 5ª are provided, together with one or more ultra-violet light generating lamps 6ª, preferably constructed in accordance with my application Serial No. 734,620, previously referred to. In the present embodiment, natural circulation of activated air is not relied on, a fan 11 being provided for circulating air over the lamp or lamps 6ª desirably operated by a switch 7ª, and causing the air activated thereby to reach all parts of the compartment and contact all the exterior surface of the stored meat 4ª, thereby sterilizing all such surfaces, whether or not they have received radiations direct from the source of ultra-violet rays. Tracks 9ª supported by brackets 10ª are desirably provided, as in the first embodiment.

Referring now to the embodiment of my invention illustrated in Fig. 3, there is shown a device 1ᵇ comprising a room or compartment 2ᵇ provided with shelves or racks 3ᵇ on which meat 4ᵇ and the like is stored, and which permit free air circulation therearound. As in the previous embodiments, cooling or heating coils 5ᵇ are provided, but the ultra-violet light generator 6ᵇ, comprising one or more lamps constructed in accordance with my application, Serial No. 734,620 previously referred to, desirably operated by a switch 7ᵇ, are not mounted in the room or compartment 2ᵇ, but in a separate chamber 12 through which air is circulated over and around said lamp or lamps 6ᵇ and coils 5ᵇ, and passes from thence into the room or compartment 2ᵇ. Tracks 9ᵇ supported by brackets 10ᵇ may also be provided, as in the preceding embodiments.

The circulating means in the present embodiment comprises a fan or blower 13 which draws air from the bottom portion of the room or compartment 2ᵇ through air-return duct 14, and forces it into the chamber 12 over the ultra-violet lamp or lamps 6ᵇ, to be humidified, sterilized, and energized so as to act on the surface of the stored meat 4ᵇ over which it flows, independently of any direct irradiation from said source 6ᵇ of ultra-violet light.

Referring now to the embodiment of my invention illustrated in Fig. 4, there is shown a device 1ᶜ comprising a room or compartment 2ᶜ provided with shelves or racks 3ᶜ on which meat 4ᶜ and the like are stored, and which permit free humidified air circulation therearound, as indicated by the arrows. As in previous embodiments, coils 5ᶜ are provided, together with an ultra-violet generator 6ᶜ, comprising one or more lamps constructed in accordance with my application Serial No. 734,620 previously referred to.

The installation desirably comprises, in addition to the horizontally disposed lamps 6ᶜ, a plurality of vertically disposed lamps 6ᵈ which extend from approximately top to bottom of the shelves 3ᶜ, or at least a substantial portion of the vertical height of said shelves, so as to previde for the direct lateral irradiation of the meat 4ᶜ.

If the shelves extend so high that radiations from the lamps 6ᵈ cannot directly reach all pieces of meat 4ᶜ, I employ one or more additional lamps 6ᵉ disposed along the wall 15 of the device 1ᶜ, in addition to the horizontally disposed lamps 6ᵈ disposed along the ceiling 16 of said refrigerator. As in previous embodiments, the lamps may be operated through a switch 7ᶜ and one or more rails 9ᶜ, supported by bracket or brackets 10ᶜ, may be provided for the transportation of the meat.

When the meat has been treated in one of the devices 1 to 1ᶜ inclusive, as described, until it has reached the desired degree of tenderization, it is desirably transported to a high humidity refrigerator, where the temperature thereof is reduced sufficiently to arrest the tenderizing process and maintain the meat in an optimum condition, insofar as is possible, until it is sold or disposed of. Such a refrigerator might be generally like the treating devices just described and should, like them, contain ultra-violet lamps in accordance with my application Serial No. 734,620, or other means for preventing the development of aerobic bacteria and mold.

As an alternative, the meat could be kept in the same compartment or device in which treated, further changes being substantially arrested by lowering to, and maintaining the temperature of the meat at or near 32° F. without freezing.

From the foregoing, it will be seen that I have developed a process and apparatus for the ripening of meat, which provide for increasing the speed of ripening by increasing the temperature at which the meat is stored, as well as developing meat of improved quality, the tendency of fat to become rancid being avoided, and the growth of mold and bacteria inhibited by using radiation having the desired characteristics, as preferably produced by a novel form of lamp described and claimed in one of my copending applications. The increase in temperature, would increase the speed of drying, but drying is inhibited either by increasing the humidity or by coating the meat with a protective film of oil.

There are three fundamental differences between my method and the old method. The first of these is the elevated temperature; the second is the increased relative humidity; and the third is the presence of radiant energy.

By practicing my invention it is possible not only to economize on the cost of refrigeration, but also to greatly increase the turnover and reduce the necessary storage space. Meat ripened or tenderized in accordance with my invention is better than usual, because it is differentially treated; that is, the connective tissue is digested or weakened more than the cells bound thereby are altered, and its flavor is not impaired by mustiness penetrating inward from a surface covered with fungoid growths and/or aerobic bacteria. Even when prevented from excessive drying by high humidity and/or a protective surface film of oil, there is some alteration of the surface of the animal tissue which results in a protective coagulum or film extending over each piece of meat, which film is so chemically altered from the ordinary tissue as to be nonsupporting to the life and growth of micro-organisms. At the same time the film is not of sufficient magnitude or toxicity as to affect its edible properties, thereby avoiding the necessity for removing it prior to sale or use of the meat. Turning the meat, so that all portions of the surface receive approximately the same amount of ultra-violet radiation, is beneficial in that the protective surface film is more uniform in composition and appearance, but such turning is not essential. Specific temperatures given are to be considered as illustrative and not binding, as the range of temperature for tenderizing meat goes as high as 98° F., in accordance with my invention.

Although specific instructions for practicing my invention have been formulated, it will be understood that I am not restricted to the particulars mentioned, as modifications may be made within the scope of the appended claims.

I claim:

1. The method of treating meat comprising holding the same at above 45° F. until internal changes have taken place to render said meat tender and palatable, while simultaneously inhibiting surface deterioration by irradiating said meat with ultra-violet light substantially restricted to the range of about 2500 to 3000 A. U.

2. The method of treating meat, comprising holding the same at a temperature of approximately 55° F. until internal changes have progressed to a point of desirable tenderness, without spoilage, while simultaneously inhibiting the development of surface growths by irradiating said meat with ultra-violet light substantially restricted to the range of between about 2500 and 3000 A. U.

3. The method of treating meat comprising coating the surface thereof with an air excluding film pervious to ultra-violet light, and holding said meat at approximately 55° F. until interior changes have progressed to a sufficient extent to render said meat tender, without spoilage, while simultaneously inhibiting the growth of molds and surface deterioration by irradiating said meat with ultra-violet light substantially restricted to the range between about 2500 and 3000 A. U.

4. The method of treating meat comprising maintaining the same at approximately 55° F. in a very humid atmosphere, until interior changes render said meat tender, without spoilage, and simultaneously inhibiting surface deterioration by irradiating said meat with ultra-violet light substantially restricted to the range between about 2500 and 3000 A. U.

5. The method of treating meat while retaining its original inherent qualities, which consists in holding it at a temperature above 45° F. to hasten tissue change therein to the point of tenderness, and inhibiting aerobic action with attendant wastage of the meat by simultaneously subjecting it to irradiation by ultra-violet light of wave lengths not appreciably greater than 3000 A. U. and having a preponderance of bactericidal radiations with substantially no infrared.

6. The method of treating meat comprising holding the same at a temperature above 45° F., until internal changes have weakened its connective tissue to such an extent that said meat is rendered tender, without spoilage, while simultaneously activating the ambient air by ultra-voilet light to inhibit the growth of molds and bacceria.

7. The method of treating meat comprising holding the same at a temperature above 45° F. until internal changes have weakened its connective tissues to such an extent that it is rendered tender, without spoilage, while simultaneously inhibiting the growth of molds and bacteria by irradiating said means with ultra-violet light.

8. The method of treating meat comprising holding the same at a temperature above 45° F. until internal changes have weakened its connective tissue to such an extent that it is rendered tender, without spoilage, while simultaneously inhibiting the growth of molds and bacteria by irradiating said meat with ultra-violet light substantially restricted to the range between about 2500 and 3000 A. U.

9. The method of treating meat comprising holding the same at a temperature above 45° F. until internal changes have weakened its connective tissue to such an extent that it is rendered tender, without spoilage, while simultaneously inhibiting the growth of molds and bacteria by irradiating said meat with ultra-violet light, and at the same time maintaining the atmosphere surrounding said meat in a state of relative humidity above about 90%, in order to preserve the muscle cells relatively intact.

10. The method of treating meant comprising holding the same at a temperature above 55° F. until internal changes have weakened its connective tissue to such an extent that said meat is rendered tender, without spoilage, while simultaneously inhibiting the growth of molds and bacteria by irradiating said meat with ultra-violet light.

11. The method of treating meat comprising holding the same at approximately 55° F. until internal changes have weakened its connective tissue to such an extent that it is rendered tender, without spoilage, while simultaneously inhibiting the growth of molds and bacteria by irradiating said meat with ultra-violet light substantially restricted to the range between about 2500 and 3000 A. U., and at the same time maintaining the atmosphere surrounding said meat in a state of relative humidity above about 90% in order to preserve the muscle cells relatively intact and allow only the connective tissue to be quickly digested.

12. The method of treating meat comprising holding the same at approximately 55° F. until internal changes have weakened its connective tissue to such an extent that it is rendered tender, without spoilage, while simultaneously inhibiting the growth of molds and bacteria by irradiating said meat with ultra-violet light substantially restricted to the range between about 2500 and 3000 A. U., at the same time maintaining the atmosphere surrounding said meat in a state of relative humidity above about 90%, in order to preserve the muscle cells relatively intact and allow only the connective tissue to be quickly digested, then reducing the temperature of said tenderized meat to, and holding it, near 32° F., without freezing, while continuing the irradiation, in order to keep it in optimum condition until disposed of.

13. The method of treating meat which comprises holding the same at approximately 55° F., until it is rendered tender, while simultaneously inhibiting the growth of molds and bacteria by irradiating said meat with ultra-violet rays, and at the same time maintaining the atmosphere surrounding said meat in a state of relative humidity of about 90%.

14. The method of treating meat comprising holding the same at a temperature of about 55° F., until internal changes have weakened its connective tissue to a point of tenderness, while simultaneously inhibiting the growth of mold and bacteria by irradiation with ultra-violet light.

15. As a new article of manufacture, a product produced in accordance with the method of claim 2.

16. As a new article of manufacture, a product produced in accordance with the method of claim 4.

17. As a new article of manufacture, a product produced in accordance with the method of claim 6.

18. As a new article of manufacture, a product produced in accordance with the method of claim 7.

19. The method of treating meat comprising holding the same at a temperature above 45° F., until internal changes have weakened its connective tissue to such an extent that said meat is rendered tender, without spoilage, while simultaneously circulating and activating the ambient air by ultra-violet light to inhibit the growth of molds and bacteria.

20. The method of treating meat comprising holding the same at a temperature above 45° F. until internal changes have weakened its connective tissue to such an extent that said meat is rendered tender, without spoilage, while simultaneously activating the ambient air with ultra-violet light substantially restricted to the range between about 2500 and 3000 A. U.

21. The method of treating meat comprising enclosing it in a compartment and holding at a temperature above 45° F., to hasten tissue change therein to the point of tenderness, in an atmosphere kept activated by ultra-violet light, in order to inhibit the growth of bacteria and molds.

22. The method of treating meat, comprising holding at a temperature above 45° F., to hasten tissue change therein to the point of tenderness, for about three or four days, while simultaneously activating the ambient air by ultra-violet light.

23. The method of treating meat comprising enclosing it in a compartment and holding at a temperature above 45° F., to hasten tissue change therein to the point of tenderness, in an atmosphere which is kept at a relative humidity of about 90% and activated by ultra-violet light, in order to inhibit the growth of bacteria and molds.

24. The method of treating meat, comprising holding the same at a temperature above 45° F., to hasten tissue change therein to the point of tenderness, while simultaneously employing ultra-violet light to inhibit the growth of molds and bacteria on said meat, then reducing the temperature of said tenderized meat to, and maintaining it near, 32° F., while continuing the employment of ultra-violet light, in order to keep said meat in the optimum condition until disposed of.

25. A tenderized meat product; free from mold, mold flavor, and slime, having substantially all of its natural moisture content, the connective tissue of which has been weakened by internal changes created by holding the product at a temperature above 45° F. in the presence of a circulating sterilizing humid atmosphere containing about 90% of its saturated moisture content, and activated by ultra-violet rays.

26. A tenderized meat product; characterized by absence of bacteria, mold, mold flavor, and mustiness, retention of color, flavor, odor, palatability, edibility, and natural moisture content, substantially as in fresh meat; the connective tissue of which has been weakened by internal changes created by holding it at a temperature above 45° F. in a humid atmosphere, while irradiated by ultra-violet light, substantially restricted to the range between about 2500 and 3000 A. U., whereby a slight coagulum is developed on its surface.

27. A tenderized meat product; characterized by absence of bacteria, mold, mold flavor, and mustiness, retention of flavor, odor, palatability, edibility, and natural moisture content, substantially as in fresh meat; having a surface coagulum, and the connective tissue of which has been weakened by internal changes created by holding it at a temperature above 45° F. in a humid atmosphere, while irradiated by ultra-violet light.

ROBERT F. JAMES.

---

CERTIFICATE OF CORRECTION.

Patent No. 2,169,081.  August 8, 1939.

ROBERT F. JAMES.

It is hereby certified that error appears in the printed specification of the above numbered patent requiring correction as follows: Page 1, first column, line 3, for "Radiating process" read Radiating Process; and second column, lines 8, 9 and 15, for "antolysis" read autolysis; page 3, first column, line 38, for "digestion" read effect; line 39, for "effect" read digestion; line 43, after "to" insert a; page 4, first column, line 23, for "bacterial" read bacteria; page 5, first column, line 32, after "invention" strike out the period and insert instead a comma; page 6, first column, line 8, for "lamps 6$^d$" read lamps 6$^c$; page 7, first column, line 2, claim 7, for "means" read meat; line 23, claim 10, for "meant" read meat; line 41, claim 11, after "90%" insert a comma; and second column, line 12, claim 18, for the claim reference numeral "7" read 9; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.

radiated by ultra-violet light, substantially restricted to the range between about 2500 and 3000 A. U., whereby a slight coagulum is developed on its surface.

27. A tenderized meat product; characterized by absence of bacteria, mold, mold flavor, and mustiness, retention of flavor, odor, palatability, edibility, and natural moisture content, substantially as in fresh meat; having a surface coagulum, and the connective tissue of which has been weakened by internal changes created by holding it at a temperature above 45° F. in a humid atmosphere, while irradiated by ultraviolet light.

ROBERT F. JAMES.

---

CERTIFICATE OF CORRECTION.

Patent No. 2,169,081.   August 8, 1939.

ROBERT F. JAMES.

It is hereby certified that error appears in the printed specification of the above numbered patent requiring correction as follows: Page 1, first column, line 3, for "Radiating process" read Radiating Process; and second column, lines 8, 9 and 15, for "antolysis" read autolysis; page 3, first column, line 38, for "digestion" read effect; line 39, for "effect" read digestion; line 43, after "to" insert a; page 4, first column, line 23, for "bacterial" read bacteria; page 5, first column, line 32, after "invention" strike out the period and insert instead a comma; page 6, first column, line 8, for "lamps 6$^d$" read lamps 6$^c$; page 7, first column, line 2, claim 7, for "means" read meat; line 23, claim 10, for "meant" read meat; line 41, claim 11, after "90%" insert a comma; and second column, line 12, claim 18, for the claim reference numeral "7" read 9; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.